United States Patent Office 2,751,659
Patented June 26, 1956

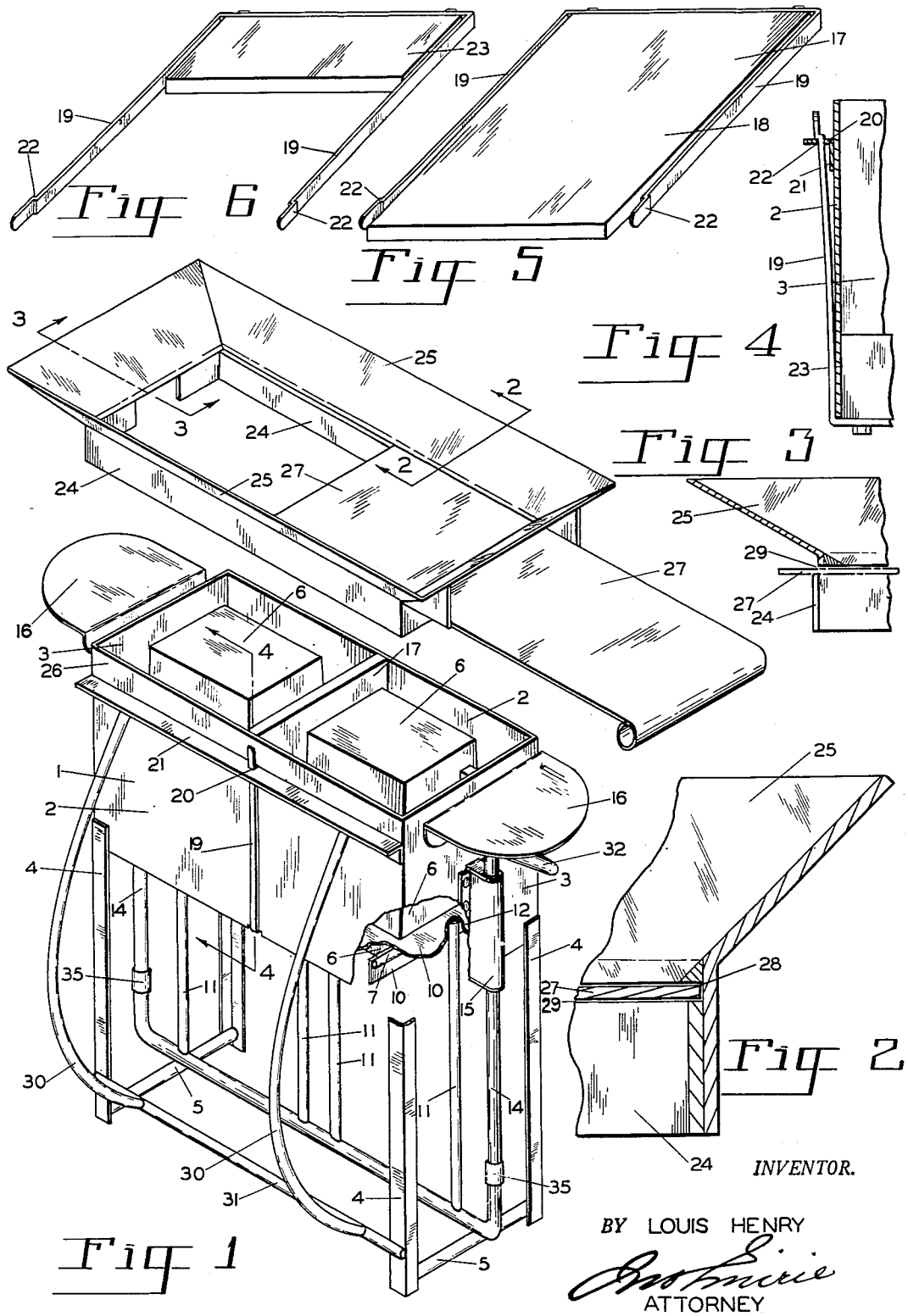

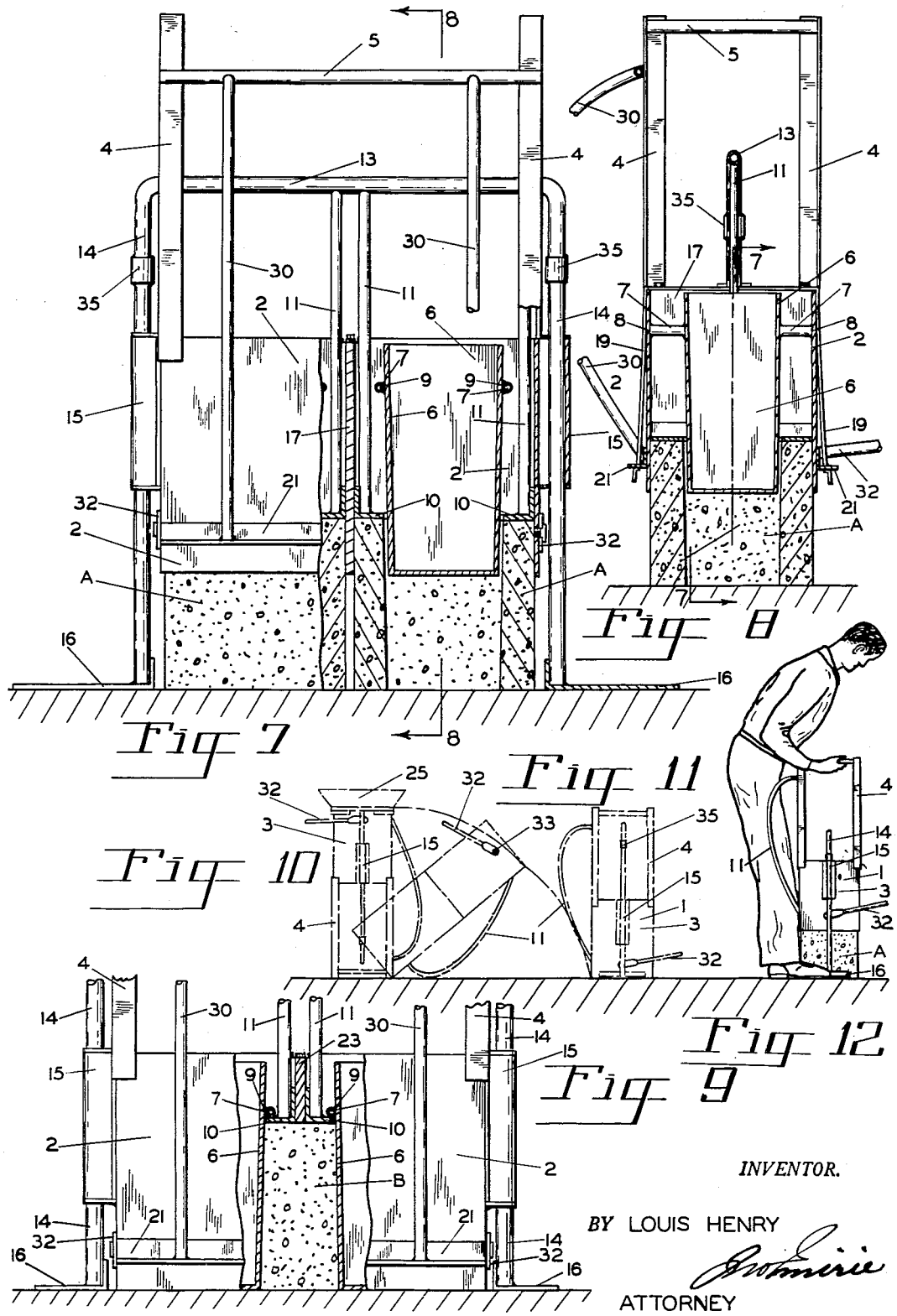

2,751,659

BLOCK FORMING APPARATUS

Louis Henry, Carlton, Oreg.

Application November 17, 1952, Serial No. 320,919

1 Claim. (Cl. 25—41)

This invention relates to improvements in a block forming apparatus.

The prime object of the invention is to provide an apparatus having molds wherein one or two blocks are formed; then the apparatus is manually rocked to turn it upside down, and the molds are raised to free the completed block or blocks on the ground or other support where the blocks are to be used.

A further object of the invention is to provide a block forming apparatus which can be conveniently moved from place to place and form blocks, and leave them where formed to cure and be subsequently used.

In the drawings:

Figure 1 is a perspective view of my block forming apparatus in position to receive mix to form blocks, parts being partly broken away; the hopper being positioned above and spaced from the body portion for illustrative purposes.

Figure 2 is a detail view of the hopper and mix leveling slide.

Figure 3 is a detail section of same showing the opposite end of the hopper and slide.

Figure 4 is a detail section taken on line 4—4 of Figure 1.

Figure 5 is a detail perspective view of the dividing partition shown in Figure 4.

Figure 6 is a detail perspective view of a section used when making full size blocks.

Figure 7 is a central vertical section of the apparatus showing its position when turned upside down to free a formed block from the mold box.

Figure 8 is a section taken on the line 8—8 of Figure 7.

Figure 9 is a section similar to Figure 7 but illustrating the use of a partition when forming full size blocks.

Figure 10 illustrates diagrammatically a side elevation of the apparatus when in position to receive a supply of mix; and when the mix is supplied and the hopper removed, the view shows how the apparatus is manually rocked to turn it upside down.

Figure 11 is a similar view showing the apparatus turned upside down and ready to be raised to free and deliver a block.

Figure 12 is a similar view showing the mold box and open frame lifted to free the block.

1 indicates a box, comprising the side walls 2 and end walls 3, supported on an open frame 4. The uprights of the open frame are connected to the corners of the box and interconnected by bars 5.

Located centrally in the box is a partition 17 to form two separate molds. In each mold is a core 6 spaced from the walls of the box and the partition. The cores are secured to cross bars 7 at 9, and not only retain the cores in position, but lend rigidity to the structure to stabilize same when operating the apparatus.

In the spaces between the cores, walls of the box and the partition, are movable bottom sections 10, on which the mix is supported when poured in the molds. Attached to and extending downwardly from the bottom sections are supporting rods 11, the lower ends of which are secured to the cross member 13 of a U-shape bar now to be described.

The U-shape bar consists of the cross bar 13 and the legs 14—14, the latter extending up to the level of the top of the apparatus. The free upper ends of the legs 14 are provided with outwardly extending foot pedals 16—16. The legs 14—14 pass through guides 15 on the sides of the box 1, and as stated, the bars 11—11 are secured to the cross bar 13.

If half blocks are being made, as shown at A, the partition 17 consists of a board, such as shown in Figure 5, and it extends downwardly below the bottom section 10. On three edges of this board is a bail of flat spring metal, the legs 19 of which are formed at their free ends with latches 22 which engage catches 20 in a reinforcing bar 21 on the side of the box.

If full size blocks are being formed, the partition 17 is removed and a smaller partition 23 is substituted, as shown in Figure 9. This partition terminates on a level with the movable bottom sections 10, leaving a space between the two cores to form a central rib in a block. This form of partition is provided with a latch, such as used in connection with the partition 17 and is of course shorter in length than said partition 17. Thus the reduced partition 23 maintains the same spacing between the movable bottoms 10 as when the partition 17 is being used to form half blocks.

Numeral 30 indicates a pair of rockers located on one side of the apparatus. The rockers are in the form of rods, secured at their upper ends to a reinforce bar 21, then curved outwardly and then inwardly and are secured at their lower ends to one of the cross bars 31 of the open frame.

25 indicates a hopper provided with a depending flange 24, on the inside of which is a groove, and at one end is a slot 29. A slide 27 operates in the slot and groove, as shown in Figures 1, 3 and 4.

In operation, the apparatus is first set up vertically on the open frame 4, with the molds open as shown in Figure 1 and the partition 17 in place to make half blocks. Then the hopper is moved over the box with the flange 24 fitted down over the outer side of the box. Mix is poured in the two mold boxes, then tamped or vibrated, then the slide 27 is forced inwardly in the groove to level off the surface of the mix. The hopper is removed, with any excess mix therein. The operator then grasps the bail 32, pivoted at 33, and rocks the apparatus on the rockers 30 to an upright position, as shown in the diagram, Figure 11. Thus, the apparatus and the formed blocks therein are turned upside down.

When in this position, the operator places both feet on the pedals 16 to hold the bottom section 10 stationary in contact with the block, as shown in Figure 7. When so held, the operator grasps the end bars 5 of the frame 4 and pulls the frame and box upwardly until the guides 15 contact the stops 35, as shown in the diagram, Figure 12. Up to the time the guides 15 contact the stops, the blocks are retained in fixed position between the ground or other support and the bottom sections 10, while they are forced from the box or mold. Then upon further upward movement of the frame and box the U-shaped bar is picked up and the whole apparatus is lifted away from the blocks, and rocked over for another operation.

The box and cores are guided upwardly on the legs 14, the guides 15 steadying this operation.

The bail 32 is used to carry the mold including the molded block to any desired location before the block is discharged from the mold.

What I claim is:

A block forming apparatus, comprising a box, an open frame depending from and supporting the box, a partition in the mold box to form a pair of molds, the partition having upwardly extending spring arms on its edges, the free ends of the arms having latches, catches on the sides of the box with which the latches engage to support the partition, a pair of cores supported in the divided box, said cores being spaced from the wall of the box, the partition, and the cores, a U-shape bar depending from the box, guides on the box through which the U-shape bar extends, bottom sections mounted in the spaces between the cores and the walls of the mold box and partition, supporting rods secured to and extending below the bottom sections and fastened at the lower ends to the U-shape bar, rockers fastened at their upper ends to the box and at their lower ends to the open frame, and means for leveling the top of the mix poured in the space formed between the cores and box and partition when forming a block, whereby the box and open frame may be rocked to turn the apparatus upside down to permit sliding the mold box on the U-shape bar free of the formed blocks.

References Cited in the file of this patent

UNITED STATES PATENTS

| | | |
|---|---|---|
| 740,024 | Kimble | Sept. 29, 1903 |
| 2,360,122 | Gelbman | Oct. 10, 1944 |
| 2,397,223 | Valdastri | Mar. 26, 1946 |
| 2,473,748 | Green | June 21, 1949 |

FOREIGN PATENTS

| | | |
|---|---|---|
| 130,366 | Australia | Nov. 30, 1948 |